United States Patent [19]

[11] 3,904,830

Every, Sr. et al.

[45] Sept. 9, 1975

[54] CALL TRACING AND IDENTIFICATION SYSTEM

[75] Inventors: Robert H. Every, Sr., Sayre; Edward J. McCabe, Wellsboro, both of Pa.

[73] Assignee: Mek-Tronix Laboratories, Mansfield, Pa.

[22] Filed: July 3, 1972

[21] Appl. No.: 268,670

[52] U.S. Cl. .............................. 179/18 FH; 179/5.5
[51] Int. Cl.[2] .............................. H04M 1/57
[58] Field of Search .... 179/18 FH, 5.5, 6 E, 27 DB, 179/90 AN, 2 A

[56] References Cited

UNITED STATES PATENTS

| | | | |
|---|---|---|---|
| 2,045,146 | 6/1936 | Jeandron et al. | 179/5.5 |
| 2,764,633 | 9/1956 | Serrataco | 179/4 |
| 2,963,553 | 12/1960 | White | 179/18 FH |
| 3,336,445 | 8/1967 | Nakagawa | 179/89 |
| 3,674,941 | 7/1972 | Guetta | 179/90 AN |
| 3,686,440 | 8/1972 | Kroeger | 179/5.5 |

*Primary Examiner*—Thomas W. Brown
*Attorney, Agent, or Firm*—O'Brien & Marks

[57] ABSTRACT

A call tracing and identification system for use with a public telephone network includes at least one interrogation and digital display circuit associated with a particular telephone of the network, and a plurality of encoder circuits associated with respective ones of all of the telephones in the system. The interrogation and digital display circuit responds to the ringing signal produced by an incoming call to generate an interrogation signal for actuating the encoder circuit associated with the calling party's telephone. In response to the interrogation command, the encoder circuit generates a series of coded signals and applies the same to the telephone line for identifying the calling party by area code and telephone number. The identification signals are received by the display network of the called telephone where they are rapidly decoded, stored and displayed in digital form.

17 Claims, 10 Drawing Figures

CALL TRACING AND IDENTIFICATION SYSTEM

BACKGROUND OF THE INVENTION

1. Field of the Invention

The present invention relates to identification systems and, more particularly, to a call tracing and identification system for a telephone network for rapidly tracing and identifying the calling party's telephone number directly to the called party.

2. Description of the Prior Art

With the numerous advantages and benefits of the modern telephone have come certain disadvantages, not the least of which has been the vulnerability of telephone subscribers to the persistent receipt of malicious, annoying and criminal telephone calls. Since the ringing signal of the telephone normally carries with it no indication as to the nature or identification of the calling party, a subscriber who has become the target of such harassment must either ignore all telephone calls or subject himself to continued annoyance. Since the calling party's anonymity remains intact throughout the duration of his criminality, it is often virtually impossible to prevent continued disturbance of the called party without changing the telephone number and withholding the listing of the new number in the telephone directory. Obviously, this has the disadvantage of requiring the innocent victim, namely the called party, to notify all friends, relatives and associates of the new telephone number and, more importantly, is no quarantee that a similar situation would not arise again in the future.

In view of the seriousness of the above-described situation, stringent laws have been passed to deter the malicious caller from perpetuating such conduct, and a number of complex call tracing system have been developed in an effort to reveal the identity of the calling party. The prior art, as exemplified by U.S. Pat. Nos. 2,879,338, 3,385,933, 3,431,364, 3,471,647, 3,522,385, and 3,576,951 is generally cognizant of call tracing equipment which is designed to be utilized at or in connection with local telephone exchange equipment to identify the telephone number of a party who has placed a malicious or annoyance call to a particular subscriber. As can be readily appreciated, the prior art systems are quite complex and generally require special interconnection of the call tracing equipment with local exchange switching by telephone personnel at high cost and possible inconvenience to other subscribers tied in with the affected telephone exchange. Furthermore, many of these systems require a particular time interval in order to properly identify the calling party, with such time interval being of such duration that the malicious caller, recognizing such delay, can hand up before the system has had a chance to complete the trace thereby avoiding identification.

In the course of developmental efforts in the field of telephone call tracing, it has also been discovered that a need exists for an economical yet effective system for rapidly identifying the telephone number of all calling parties whether a called subscriber answers his phone or not. In this way, not only will malicious or prank calls be traced, but calls missed while a subscriber is away from his telephone can also be identified simply and automatically.

While numerous attempts have been made to solve these and other related problems, the solutions heretofore proposed have only been partially satisfactory due to their complexity, high cost, slow speed of operation, required interconnection and disruption of local telephone exchange equipment, and overall ineffectiveness in combating the problem of the malicious or prank caller.

SUMMARY OF THE INVENTION

It is, therefore, an object of the present invention to rapidly identify a calling subscriber directly to the called party.

A further object of this invention is to identify and store the telephone number of a calling party independently of whether the called party responds to the call.

The present invention has another object in the transmission, receipt, storage and digital display of a telephone number between two parties in a telephone system.

A further object of the present invention is to generate and transmit an interrogation signal over the telephone lines in response to the receipt of a ringing signal by a called subscriber.

A still further object of this invention is the construction of a call tracing and identification circuit which may be readily incorporated with existing public telephone facilities without modification.

The present invention is summarized in that a call tracing and identification network for a telephone system includes an encoder circuit associated with a first subscriber telephone line of the telephone system for storing bits of self-identification information and for applying electrical signals representing the information bits to the first line in response to the receipt of an interrogation signal, and a display circuit associated with a second subscriber telephone line of the telephone system for selectively generating the interrogation signal and applying the same to the second line for transmission through the telephone system to the first line and for converting electrical signals subsequently received from the encoder to a visually perceptible form identifying the first subscriber.

The present invention is advantageous over prior art systems in that it is economical, effective, may be readily installed with existing equipment without modification, provides accurate storage and identification of telephone calls independently of whether they are answered and rapidly traces annoyance calls.

other objects and advantages of the present invention will become apparent from the following description of a preferred embodiment when taken in conjunction with the accompanying drawings.

BRIEF DESCRIPTION OF THE PREFERRED EMBODIMENT

Figure 1:
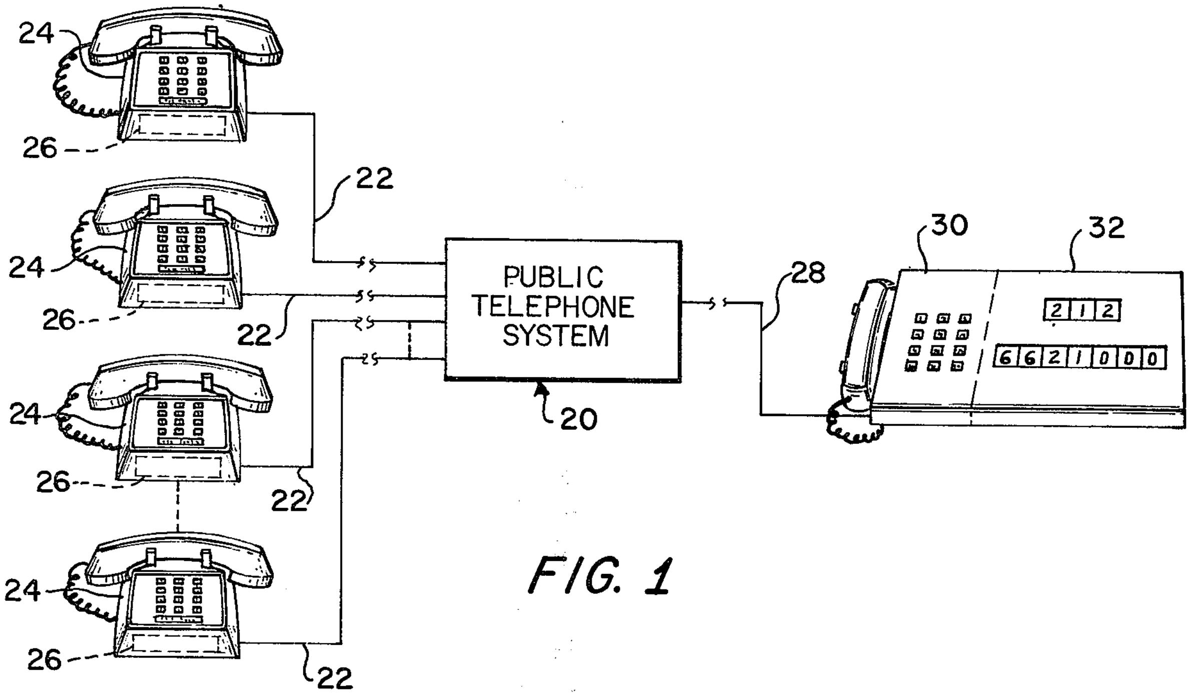
FIG. 1 is a diagrammatic view of a preferred embodiment of a call tracing and identification system according to the present invention as utliized in conjunction with a public telephone network.

A preferred embodiment of the call tracing and identification system according to the present invention is shown diagrammatically in FIG. 1 in connection with its use with a telephone network, shown for illustrative purposes as public telephone system 20. It should be understood, of course, that any number of various communication networks may be utilized in conjunction with the present invention, with public telephone system 20 used herein in an exemplary rather than a limiting sense.

Connected with the public telephone system 20 via conventional lines 22 are a plurality of telephone devices 24 each containing an encoder circuit 26 according to the present invention. Also connected with the public telephone system 20 via telephone line 28 is at least one additional telephone device 30 in which has been incorporated an interrogation and digital display circuit 32 of the present invention for providing a visually perceptible digital readout of identifying signals received from any of the various encoder equipped telephones 24.

Figure 2:
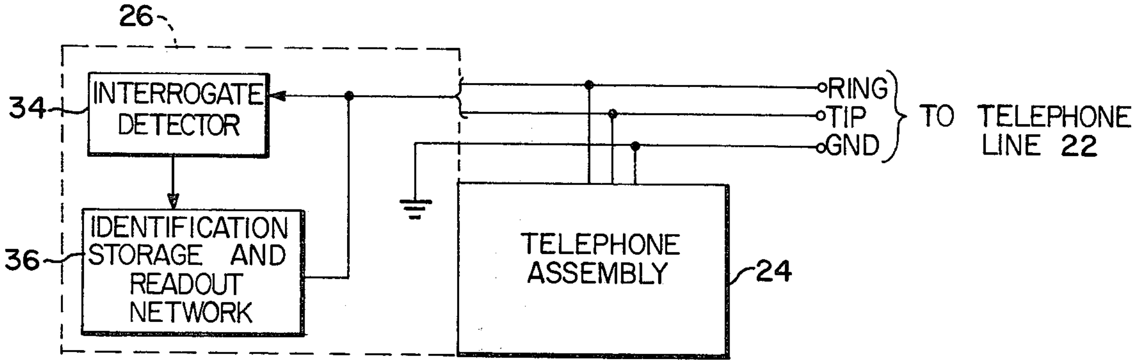
FIG. 2 is a block diagram of the encoder circuit of the system of FIG. 1.

The encoder circuit 26 of the present invention is illustrated in block form in FIG. 2 and includes an interrogation pulse detector 34 which has its input connected to the ring and tip leads of telephone line 22 and is responsive to an interrogate signal received from the public telephone system to generate a command for initiating the operation of an identification storage and readout network 36. As shown in FIG. 2, the output of the identification storage and readout network 36 is connected to the ring and tip conductors of the telephone line 22 so as to apply encoded identification signals to the telephone line for transmission through the telephone exchange equipment to the called party.

Figure 3:
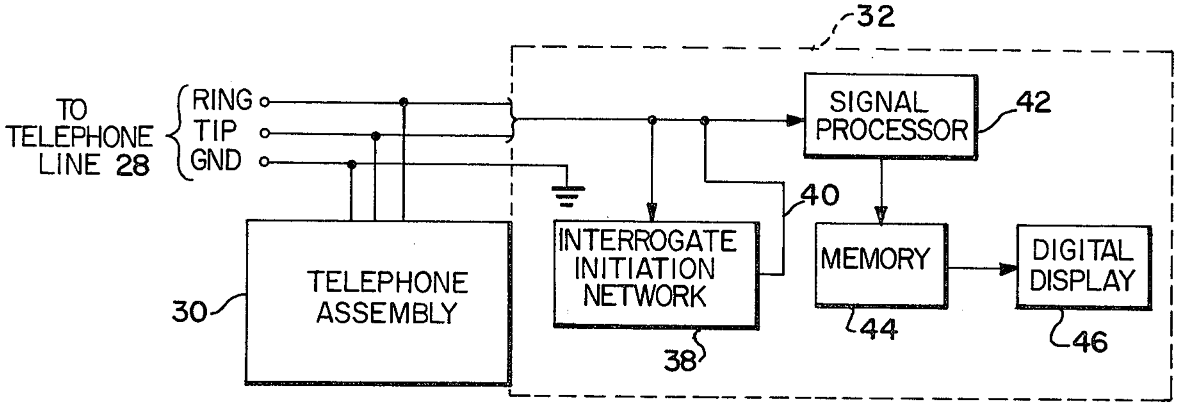
FIG. 3 is a block diagram of the interrogation and digital display circuit of the system of FIG. 1.

At the opposite end of the line, the interrogation and digital display network, shown in block form in FIG. 3, cooperates with the encoder circuit to provide an almost instant digital display of the calling party's telephone number. The interrogate and display network includes an interrogate initiation network 38 which is connected to the ring and tip conductors of telephone line 28 so as to receive the incoming ringing signal generated by an incoming call. In response to the initial signal burst of the ringing signal, the interrogate initiation network 38 generates the interrogate pulse signal which is applied via line 40 back to the telephone line 28 and thence through the public telephone exchange equipment 20 to the interrogate detector 24 of encoder network 26 (FIG. 2). Subsequently, encoded identification signals transmitted by the calling encoder are received by the interrogation and display network 32 whereupon they are applied to a signal processing network 42. Network 42 feeds sequential bits of identifying information to a memory bank 44 where the information bits are stored in binary form. As shown in FIG. 3, the output of the memory bank 44 is fed to a digital display arrangement 46 which includes a plurality of individual alphanumeric character display devices for providing a direct visually perceptible readout of the decoded identifying signals.

Before proceeding to the circuit details of the present invention, the general sequence of operation of the tracing and identification system according to the present invention will be briefly described.

Upon the placing of a telephone call from the calling party, hereinafter referred to as party A, to a called party, hereinafter referred to as party B, a ringing signal will be transmitted from the local telephone exchange of the public telephone system 20 over telephone line 28 to telephone device 30 of party B. In response to the receipt of the initial signal burst of the ringing signal, the interrogate initiation network 38 will generate an interrogation signal which is reapplied back through the telephone system to the encoder unit 26 of party A. Interrogate detector 34 responds to the received interrogation signal and initiates the readout of the coded identification signals stored by readout network 36. At this same time, the digital display equipment of party B is reset and is thus conditioned for the receipt of the encoded identification signal now transmitted from party A.

The coded identification signal is received by the digital display network 32 of party B and is fed through signal processor 42 where it is sequentially routed to a series of individual memory circuits of memory bank 44. The signals are converted from a serial, binary form into a parallel, digital form where they are stored and then fed to the digital display 46 for readout. It is noted that the entire tracing and identification sequence is completed in a matter of seconds and is independent of whether the telephone of party B is answered or not. In view of the inclusion of memory bank 44 in the digital display circuit according to the present invention, the received identifying signals which have been decoded, stored and displayed will be retained in the event the call is unanswered until a subsequent call is received. The system also acts to automatically reset the display network and the memory bank when such subsequent call is made. In this manner, an incoming telephone call which has been missed by a subscriber who is away from his telephone will automatically be displayed thereby providing a type of answering service for the subscriber. Of course, only a single telephone number can be displayed by the preferred exemplary embodiment described hereinbelow; however, it should be appreciated that the system may be readily expanded to store any number of incoming calls for simultaneous or sequential display.

Figure 4:
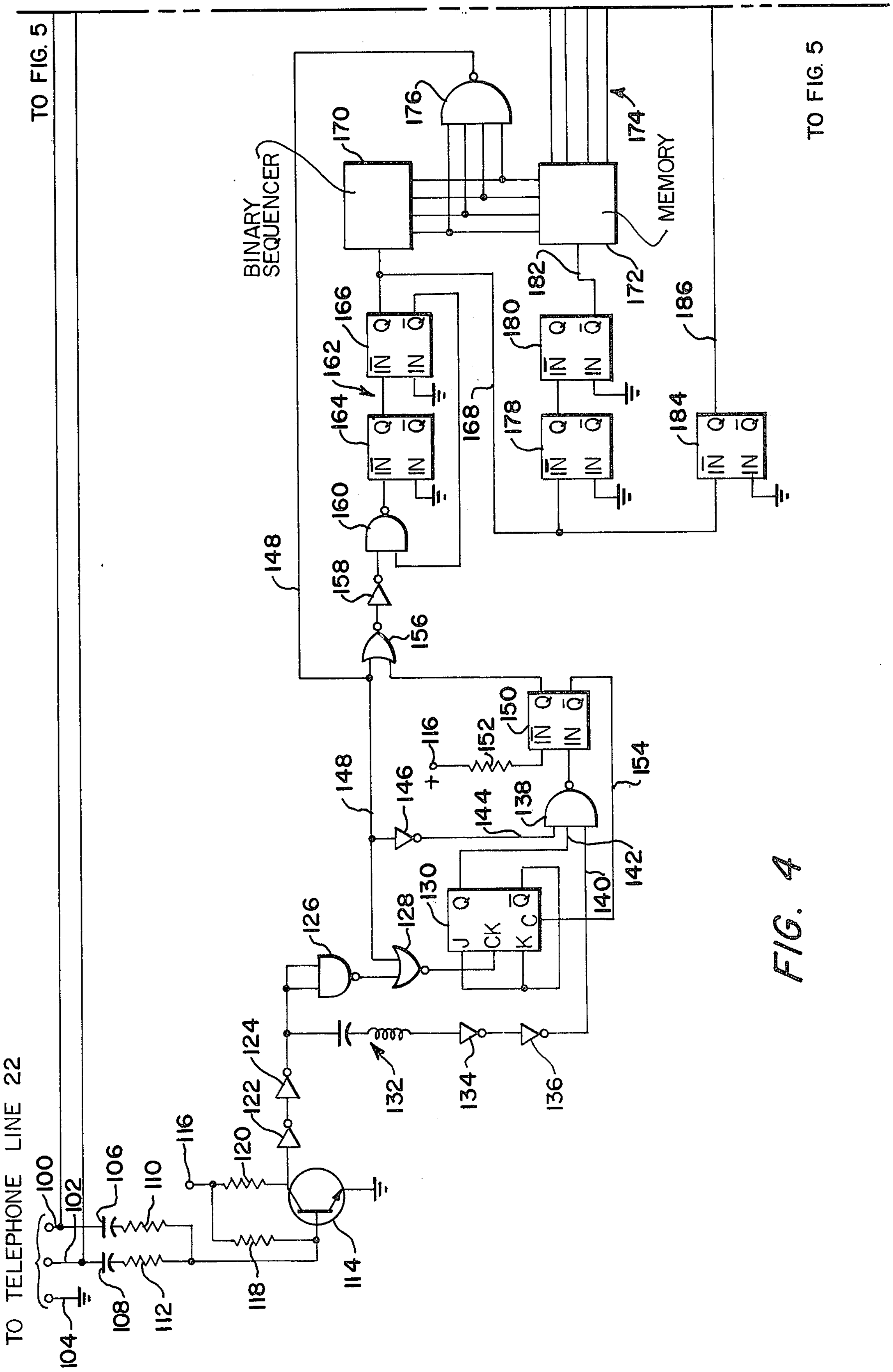
FIGS. 4, 5 and 6 are schematic diagrams which, when taken together as shown in FIG. 7, illustrate a preferred embodiment of the encoder network of FIG. 2.
Figure 5:
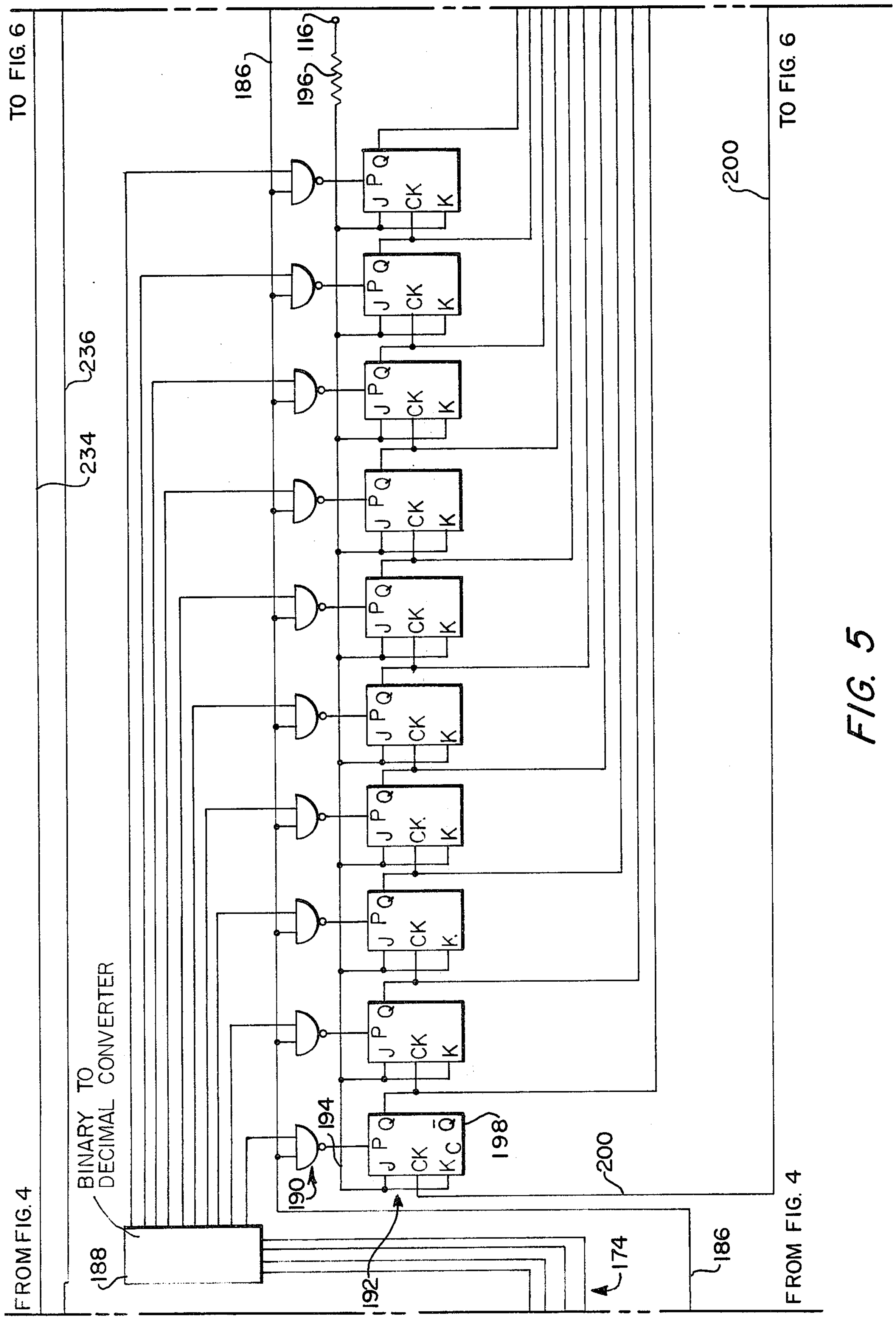
Figures 6, 7:
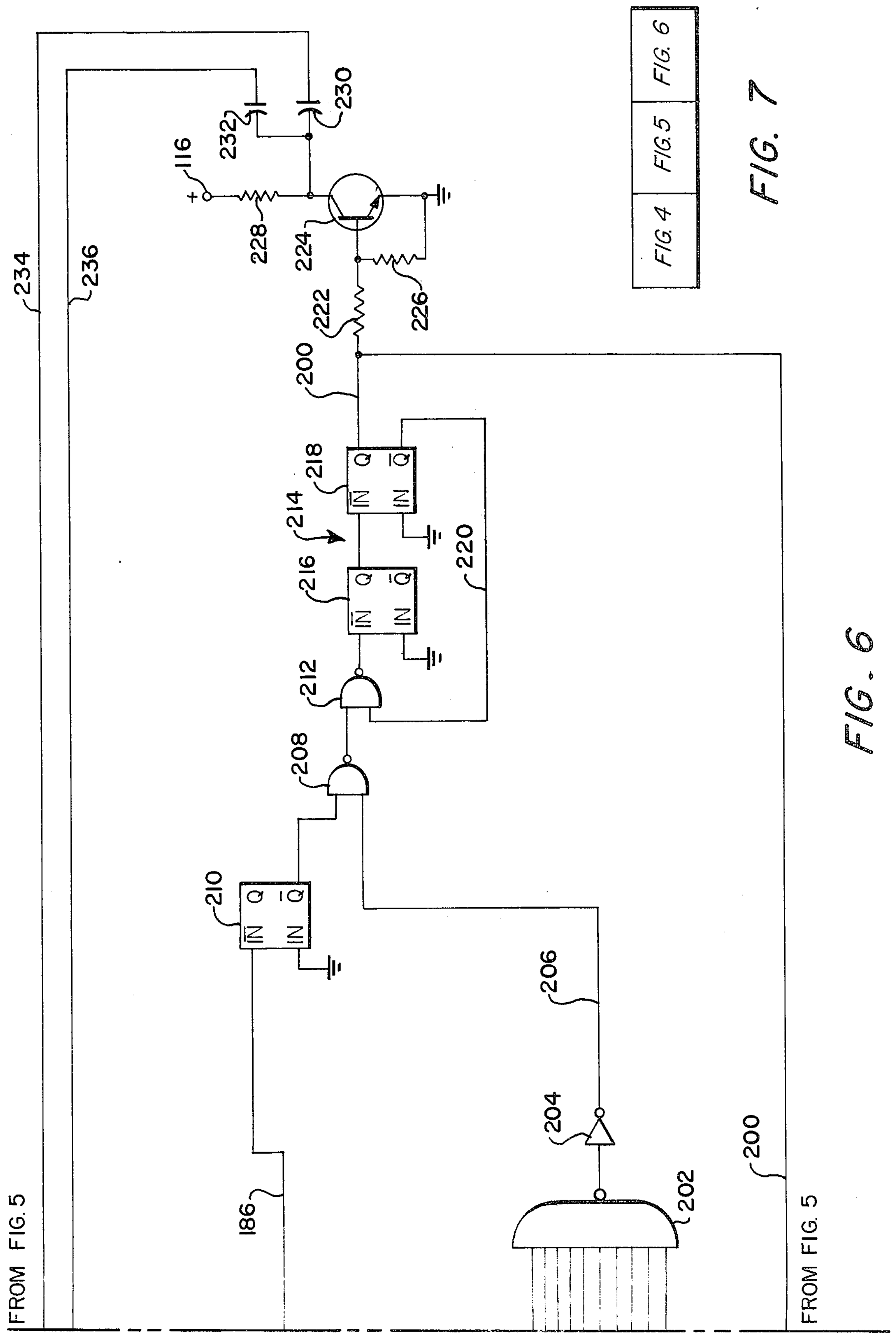

Referring to FIGS. 4, 5 and 6, the telephone line 22 which feeds telephone assembly 24 and encoder network 26 includes ring and tip conductors 100 and 102, respectively, and a ground conductor 104. Ring and tip conductors 100 and 102 are each fed through a respective series network including a capacitor 106–108 and a resistor 110–112 to the base electrode of a transistor 114. Transistor 114 has its emitter electrode tied to ground while its base and collector electrodes are connected with a source of positive potential, represented by terminal 116, through resistors 118 and 120, respectively. The bias of the transistor is set so that it is normally conductive or "on". The output of transistor 114 is taken from the collector electrode thereof and fed through a serial pair of inverter circuits 122 and 124 to both inputs of a NAND gate 126. The output of gate 126 is connected to one input of a NOR gate 128 which, in turn, has its output connected to the clock input of a flip-flop 130 having its $\overline{Q}$ output connected to both the J and K inputs thereof.

Also connected with the output of inverter circuit 124 is an LC tuned network 132 which is coupled through a second pair of serial inverter networks 134 and 136 to a NAND gate 138 at input 140 thereof. A second input 142 of NAND gate 138 receives the Q output of flip-flop 130, and a third input 144 of gate 138 is connected to the output of an inverter circuit 146 which receives its input signal from a signal line 148. Line 148 also feeds the second input of NOR gate 128.

The output of NAND gate 138 is coupled to the positive-going input of a monostable multivibrator 150 which has its negative-going input tied to positive source 116 through a resistor 152. The $\overline{Q}$ output of monostable device 150 is tied to the clear input of flip-flop 130 via line 154, and the Q output is connected at one input of a NOR gate 156 having a second input tied with line 148. The output of the NOR gate 156 is inverted by network 158 and fed to one input of a two-input NAND gate 160 which drives a clock circuit indicated generally at 162 and formed by the serial interconnection of a pair of monostable devices 164 and 166. To render the clock free-running, the $\overline{Q}$ output of monostable multivibrator 166 is fed back through the second input of NAND gate 160 as shown. The output of clock 162 is taken from the Q output of monostable device 166 and is fed to a main control line 168.

Connected to control line 168 is the input of a four-bit binary counter or sequencer 170 which has its four output terminals connected to the inputs of the read-only binary memory network 172. Memory network 172 is programmed to store, in binary form, the 10 digits representing the particular subscriber's area code and telephone number such that as the binary input is sequenced each of the 10 binary digits will be applied to its four output terminals, identified collectively at 174. The output signals of the binary sequencer 170 are also fed to the inputs of a four-input NAND gate 176 which responds to the full count of the binary sequencer to supply a logical 0 level signal to line 148 for the control of gates 128, 138 and 156.

Control line 168 is also coupled to the negative-going input of a monostable device 178 having its positive-going input tied to ground and its Q output tied to the negative-going input of a second monostable device 180. Similarly, monostable device 180 has its positive-going input tied to ground and provides a signal pulse on its $\overline{Q}$ output in response to the timing-out of device 178. The $\overline{Q}$ output of monostable device 180 is fed via line 182 to an enabling input of memory circuit 172 such that after the memory circuit is addressed each time by the binary sequencer, readout will not be provided on lines 174 until the enable signal from monostable device 180 has been generated. Another monostable device 184 has it positive-going input grounded and its negative-going input tied to control line 168 so as to provide a control signal at its Q output in response to the cyclic operation of clock 162. This control signal is fed via line 186 to a set of NAND gates, described hereinbelow.

Referring to FIG. 5, output lines 174 from the memory circuit 172 are fed to the four inputs of a binary to decimal convertor or decoder 188 which has each of its ten decimal outputs connected to one imput of a respective one of a bank of two-input NAND gates, indicated collectively at 190. Each of the other inputs of NAND gates 190 is connected in common to line 186 from monostable device 184. The ten outputs from NAND gates 190 are connected to the preset inputs P of a respective one of a bank of 10 flip-flops indicated collectively at 192. Each of the flip-flops 192 has its J and K inputs connected in common to a positive supply bus 194 which is coupled through a resistor 196 to the positive potential source 116. The first flip-flop 198 of bank 192 has its clock input connected to a clock pulse line 200 from the encoder clock network to be described below, and each successive flip-flop has its clock input connected to the Q output of the immediately preceeding flip-flop. The Q outputs of flip-flops 192 are coupled to the ten inputs of a NAND gate 202 which has its output fed through an inverter 204 to line 206.

As shown in FIG. 6, line 206 is tied to one input of a two-input NAND gate 208 which receives at its other input the $\overline{Q}$ output of a monostable multivibrator 210. Monostable device 210 has its positive-going input tied to ground and receives the signal on line 186 on its negative-going input as illustrated. The output of NAND gate 208 is fed through one of the two inputs of a NAND gate 212 to the encoder readout clock, indicated generally at 214. Clock 214 includes a pair of monostable devices 216 and 218 which are connected in series, with a feedback signal applied from the $\overline{Q}$ output of device 218 to the second input of NAND gate 212 via line 220. The Q output of monostable device 218 supplies readout and clock pulses to line 200.

Line 200 is coupled through a resistor 222 to the base electrode of a transistor 224 which has its emitter electrode returned directly to ground and its base electrode tied to ground through a resistor 226. The collector of transistor 224 receives biasing potential from source 116 through a resistor 228 such that the transistor is normally biased to a non-conductive or "off" state. The output of transistor 224 is taken from its collector electrode and applied through parallel branched capacitors 230 and 232, and lines 234 and 236 to the ring and tip conductors 100 and 102, respectively, of telephone line 22.

Figure 8:
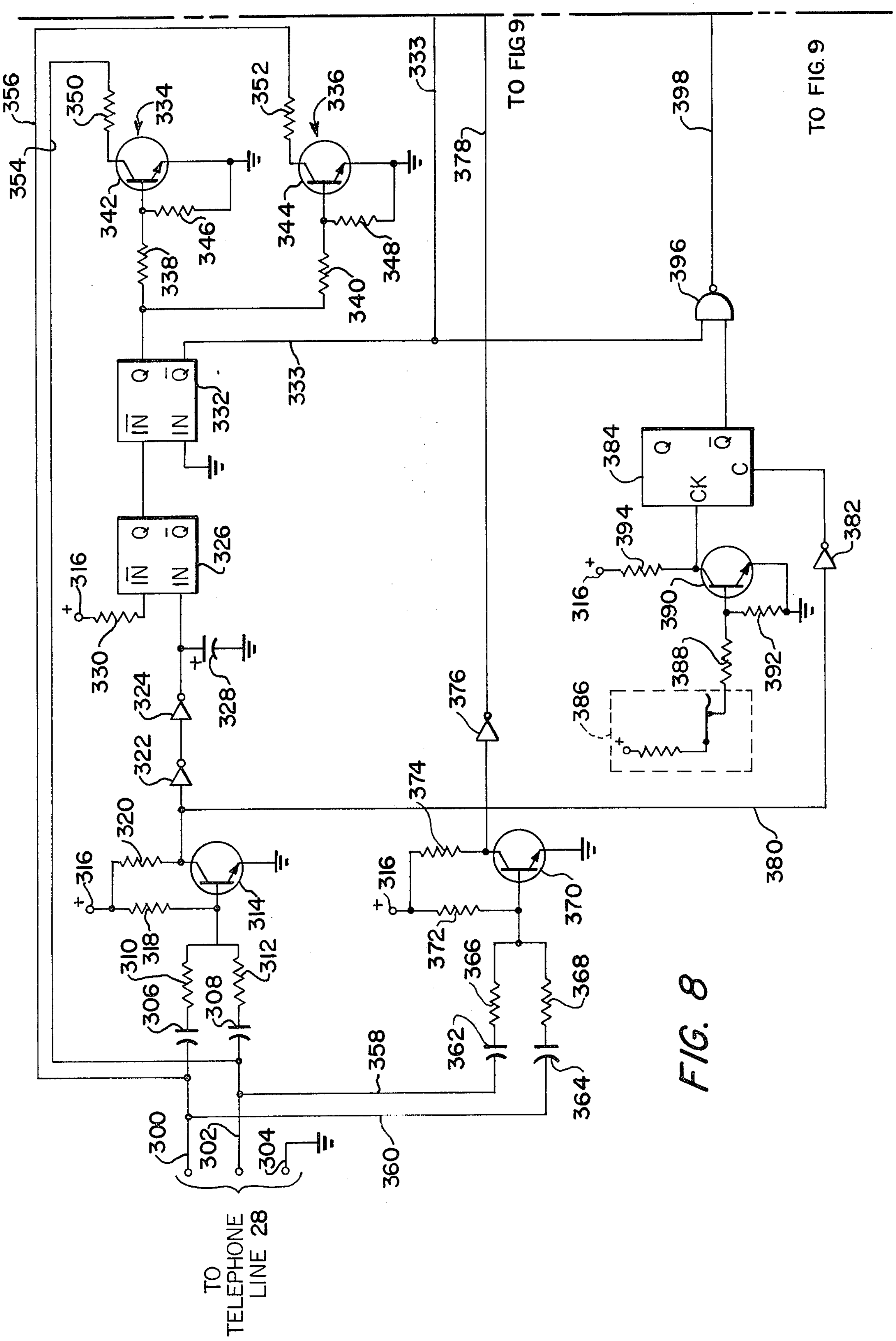
FIGS. 8 and 9 are schematic diagrams which, when taken together as shown in FIG. 10, illustrate a preferred embodiment of the interrogation and digital display network of FIG. 3.
Figures 9, 10:
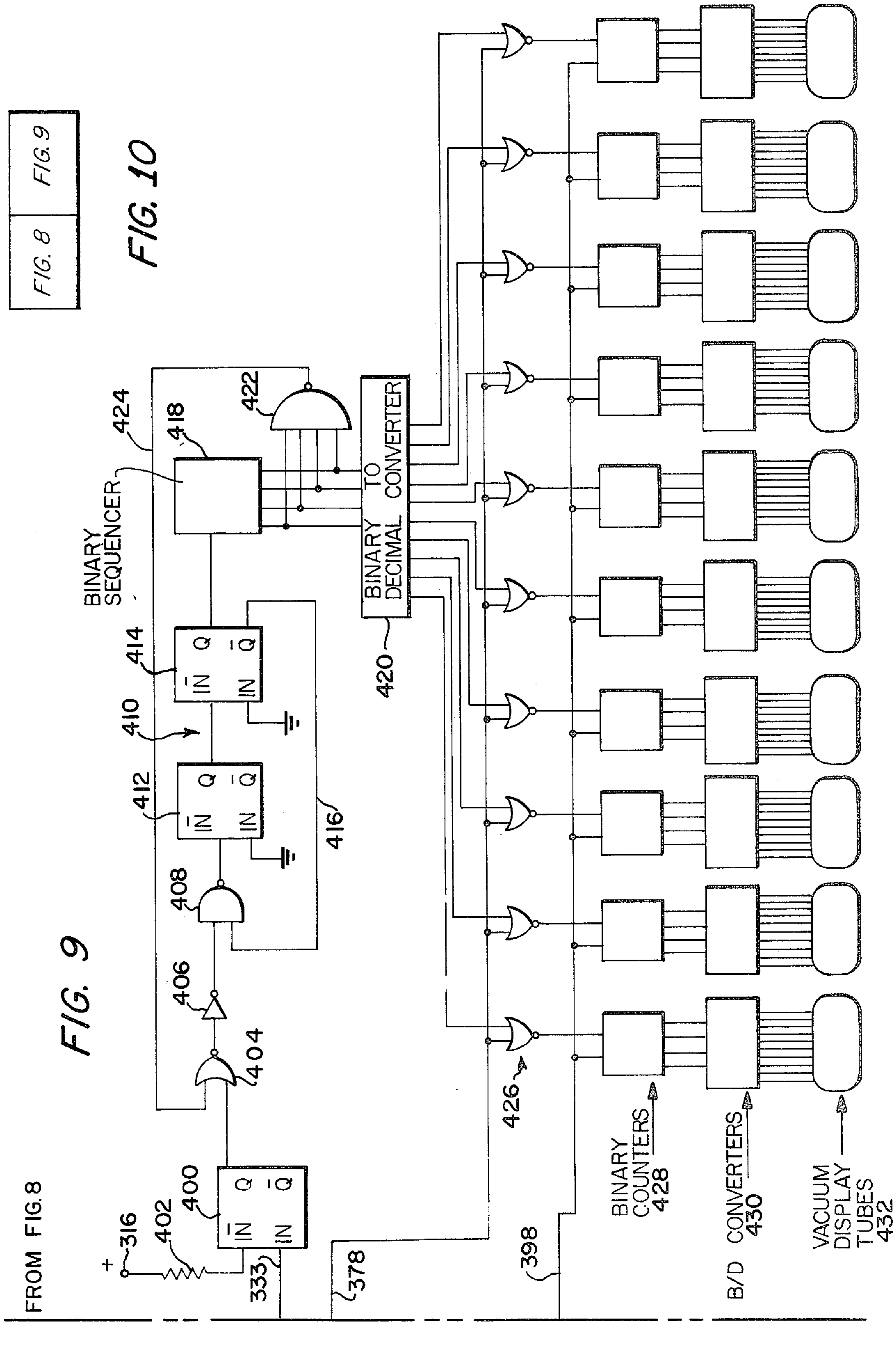

Referring now to FIGS. 8 and 9, the interrogate and digital display network 32 according to the present invention is connected with telephone line 28 which includes ring and tip conductors 300 and 302, respectively, as well as a ground conductor 304. Conductors 300 and 302 are each connected through a respective series network including a capacitor 306–308 and a resistor 310–312 to the base electrode of a transistor 314. The emitter electrode of transistor 314 is returned to ground, and the base and collector electrodes thereof are coupled to a suitable source of operating potential indicated by terminal 316 through resistors 318 and 320, respectively.

Transistor 314 is normally in a conductive or on state and is responsive to the receipt of a ringing signal burst on telephone line 28 to revert to a non-conductive or off condition. The resultant signal developed by transistor 314 is taken from its collector electrode and fed through a serial pair of inverter circuits 322 and 324 to the positive-going input of a first monostable device 326. An electrolytic capacitor 328 is connected between the junction of inverter 324 and monostable device 326 and ground to preclude the further actuation of the monostable device after capacitor 328 has become at least partially charged.

The negative-going input of monostable device 326 is tied to source 316 by a resistor 330, and a delayed pulse generated by the device is taken from its Q output and fed to the negative-going input of a second monostable device 332. Monostable device 332 has its positive-going input tied to ground and its $\overline{Q}$ output applied to branched conductor 333 for supplying sequence-clock initiation and display reset signals to circuitry to be described below. The Q output of device 332 is likewise coupled through like branched circuits 334 and 336 to the ring and tip conductors 300 and 302 of telephone line 28. Each of the circuits 334 and 336 includes a resistor 338–340 connected from the Q output of monostable device 332 to the base electrode of a transistor 342–344. A resistor 346–348 connects the base electrode of the transistor to ground with its emitter electrode tied directly thereto. The collector electrodes of transistors 342 and 344 are each fed through a resistor 350 and 352, respectively, to conductors 354 and 356 which are returned to the telephone line 28.

Upon receipt of a ringing burst signal on line 28, the normally on transistor 314 will revert to a non-conductive state to provide a positive-going pulse which is then shaped by inverter networks 322 and 324 to trigger monostable deivce 326 and, after a delay, monostable device 332. The output from monostable 332 is thence shaped by transistor networks 334 and 336 and reapplied to the telephone line as an interrogation signal for transmission back to the calling party. Subsequent to the actuation of the encoder readout sequence as will be described hereinbelow, a series of pulse trains each representing an information bit of the ten digit subscriber identification code will be received by the interrogate and digital display circuit 32. Upon receipt of the information signals on ring and tip conductors 300 and 302, the signals are fed over lines 358 and 360 through capacitors 362 and 364 and resistors 366 and 368, respectively, to the base electrode of transistor 370. Transistor 370 is biased to a conductive or on state by the connection of its emitter electrode to ground and its base and collector electrodes to positive source 316 by resistors 372 and 374, respectively. The identification signals fed through transistor 370 are taken from its collector electrode and applied through an inverter circuit 376 to an information line 378 which feeds the storage and digital display circuitry to be described below.

The output of transistor 314, as provided on the collector electrodes thereof, is also coupled via a line 380 and inverter 382 to the clear input of a flip-flop 384. Clock signals for flip-flop 384 are provideed by circuitry which includes the hook switch of telephone device 30 shown diagrammatically at 386. The hook switch is connected through a resistor 388 to the base electrode of a transistor 390 having its emitter tied directly to ground and its base electrode returned to ground through a resistor 392. Transistor 390 has its collector electrode coupled to operating potential source 316 by a resistor 394 with the collector supplying clocking signals to the clock input of the flip-flop 384 as shown. The $\overline{Q}$ output of flip-flop 384 is fed to one side of a two-input NAND gate 396 which has its second input tied to reset signal line 333. The output of NAND gate 396 provides a display reset signal on line 398 for resetting the digital display and storage network illustrated in FIG. 9.

Referring to FIG. 9, signal line 333 is connected to the positive-going input of a monostable device 400 which has its negative-going input tied to source 316 by a resistor 402. The Q output of the monostable device is fed through one side of a NOR gate 404 and an inverter 406 to one input of a two-input NAND gate 408. The output of NAND gate 408 is applied to the negative-going input of a sequence control clock, indicated generally at 410 and including a pair of monostable devices 412 and 414. The $\overline{Q}$ output of monostable device 414 is fed back via line 416 to the second input of NAND gate 408, with monostable devices 412 and 414 being connected in series. The output of sequence clock 410 is taken from the Q terminal of monostable device 414 and applied to the input of a four-bit binary sequencing counter 418 which has its binary outputs coupled directly to a binary to decimal convertor or decoder 420. The outputs of binary sequencer 418 are similarly connected to the inputs of a four-input NAND gate 422 which, when the binary sequencer has completed a particular count sequence, provides an output signal on line 424 which is fed back to the second input of NOR gate 404. Each of the 10 outputs of the binary to decimal convertor 420 is fed to one input of a respective one of a bank of two-input NOR gates, indicated generally at 426 which receive in common at their second inputs the information signals from line 378. The outputs of each of the NOR gates 426 are applied to a respective one of a set of four-bit binary counter and storage networks 428 which have their outputs connected to feed a set of binary to decimal convertors or decoders 430 as shown. Each of the binary to decimal convertors 430 is adapted to drive a suitable readout device such as one of a set of 10 vaccum display tubes 432. Each of the vacuum display tubes 432 provides a visually perceptible readout of a single one of the 10 area code and telephone number digits or information bits received from the calling party.

Before proceeding with a description of the operation of the present invention, it should be understood that any number of various types of individual logic elements may be utilized in carrying out the teachings of the present invention, with the illustrated NAND and NOR logic networks being described as exemplary only.

For the purposes of clarity, each of the NAND gates utilized in the present invention functions in accordance with the following conventional truth table:

| INPUTS | | OUTPUT |
|---|---|---|
| 0 | 0 | 1 |
| 0 | 1 | 1 |
| 1 | 0 | 1 |
| 1 | 1 | 0 |

Similarly, each of the NOR gates performs a logic function in accordance with the following truth table:

| INPUTS | | OUTPUT |
|---|---|---|
| 0 | 0 | 1 |
| 0 | 1 | 0 |
| 1 | 0 | 0 |
| 1 | 1 | 0 |

THE ENCODER NETWORK

Prior to the initiation of a call from telephone 24, equipped with encoder network 26, to telephone 30, equipped with interrogation and digital display network 32, both circuits are in a standby state as described below. Referring first to the encoder circuit shown in FIGS. 4, 5 and 6, in the standby state transistor 114 is conductive or on, master clock 162 is off, and the binary sequencer 170 provides a logical 1 level on all four output leads. With all four outputs of the sequencer 170 at a logical 1, NAND gate 176 produces a logical 0 output which is fed back via line 148 to one of the two inputs of NOR gate 156 and, through inverter 146, to input 144 of NAND gate 138. Similarly, all of the outputs of the memory readout network 172 are at a logical 1 level causing the binary to decimal converter 188 to generate a logical 1 on all of its outputs. At this time a logical 0 appears on line 186 feeding each of the NAND gates in bank 190 such that the outputs thereof are all at a logical 1 level, presetting the flip-flops 192 accordingly. The readout clock 214 is also off at this time producing a 0 output on lead 200 thereby enabling transistor 224 to assume a non-conductive or off state.

When the calling party desires to place a call, and lifts the telephone receiver off the hook, transistor 114 responds thereto by reverting to a non-conductive or off state such that its collector electrode goes to a logical 1 level. The switching signal from the collector electrode of transistor 114 is applied through the double inverter stage 122–124, for wave shaping purposes, and is fed to both inputs of gate 126. With both inputs of gate 126 at a logical 1 level, the output thereof, and consequently the input of gate 128, assumes a logical 0. With a logical input applied from line 148 to the other input of NOR gate 128, its output now switches from a logical 0 to a logical 1. This positive-going pulse is applied to the clock input CK of flip-flop 130. Flip-flop 130 is not tripped by this positive-going pulse, however, since the clock input flip-flop only responds to the falling or negative going edge of the clock input signal.

When the first dialing pulse is applied to the telephone line by the calling party, transistor 114 turns on again, pulling both inputs of NAND gate 126 to a logical 0 and generating, through NOR gate 128, a negative-going pulse on the clock input of flip-flop 130. This results in the transition of the Q output of flip-flop 130 to a logical 1 and the $\overline{Q}$ output thereof to a logical 0. The logical 1 signal on the Q output of flip-flop 130 is fed to input 142 of NAND gate 138 and acts in concert with the logical 1 signal on input 144 to enable the gate for the receipt of an interrogation command signal. At this same time, the logical 0 on the $\overline{Q}$ output of the flip-flop disables both the J and K inputs thereof to preclude further actuation of the flip-flop in response to subsequently received dial pulses. Since both inputs 142 and 144 of NAND gate 138 are now at a logical 1 level, a logical 1 signal applied to input 140 will cause the output of the gate to switch from a logical 1 level to a logical 0. In view of the connection of input 140 back through inverters 134 and 136 and tuned network 132 to the switched output of the telephone line, gate 138 will generate a logical 0 output upon the receipt of an interrogation command signal from the interrogate and digital display network of the called party. It can be appreciated that in this manner the encoder circuit is precluded from transmitting an identification signal until the calling party has first removed the handset from its cradle and begun the dialing sequence. The system thus prevents a subscriber's telephone from being interrogated without his knowledge.

When the interrogation pulse generated by the interrogation and digital display network of the called party is received over the telephone line 22, it is level shifted and amplified by transistor 114 and then passed through inverters 122 and 124 to the tuned network 132. LC network 132 is pretuned to pass only the interrogation pulse whereby only interrogation command signals will be fed to inverters 134 and 136 for enabling gate 138. The received interrogation pulse applied to input 140 of gate 138 along with the logical 1 signals on inputs 142 and 144 thereof cause the output of the gate to go to a logical 0 level. On the trailing edge or positive-going side of the interrogation pulse, i.e., when the output of the NAND gate 138 reverts back to a logical 1 level, the interrogation detector 150 fires. The resultant signal on the $\overline{Q}$ output of monostable device 150 is fed by line 154 to the clear input of flip-flop 130 resetting the same for the receipt of a subsequent interrogation signal. The firing of the interrogation detector 150 also generates a logical 1 signal on its Q output which results in the switching of the output of NOR gate 156 to a logical 0. The inversion of the output of gate 156 by network 158 causes the output of NAND gate 160 to revert to a logical 0, thus iniating the operation of master clock 162.

The output of the master clock 162 is taken from the Q output of monostable device 166 and appears on line 168. Each time the signal on line 168 switches from a logical 1 to a logical 0 level, the following sequence of events occurs. First, the binary sequencer 170 will be stepped so as to feed the first four-bit binary address to the binary select inputs of the read-only storage or memory network 172. Accordingly, the output of memory circuit 172 on lines 174 will be a binary character representing the first digit or bit in the identification message. For example, the first digit may be the first digit of the calling subscriber's area code. At the same time that the binary sequencer 170 is stepped, a negative-going output signal from the master clock 162 fires monostable device 184 causing its Q output to assume a logical 1 level. The logical 1 signal is fed to line 186, and as a result, one side of each of the NAND gates 190 receives a logical 1 input.

Simultaneously, monostable device 178 is fired which, after a short interval, reverts to its quiescent state causing a negative-going input signal to be applied to monostable device 180. Thus, device 178 functions as a delay network to withhold the application of the clock output signal on line 168 to the monostable device 180 for an interval of time sufficient to allow the output of monostable device 184 to completely stabilize at a logical 1 level. In this manner, thhe application of a logical 1 input signal to all of the NAND gates 190 via line 186 is assured before initiating the read-in or strobe sequence to be described below.

When the delay one-shot 178 reverts to a logical 0, and monostable device 180 fires, it produces an enable signal on line 182 which enables the readout of memory circuit 172. That is, upon receipt of the enable signal, memory circuit 172 applies the stored binary number addressed by sequencer 170 to lines 174. Thus, when the $\overline{Q}$ output of monostable device 180 assumes a logical 0, the read-only circuit 172 applies the addressed binary number to the input of binary to decimal convertor 188. The binary to decimal decoder 188 converts the binary input signal to digital form. The 10 resulting output signals from the decoder 188 are fed to corresponding ones of the NAND gates 190. Since gates 190 are enabled at this time by the signal on line 186, the convertor 188 output signals are applied to the preset inputs of the parallel to serial convertor comprising flip-flops 192.

When the monostable device 184 times out, its Q output reverts to a logical 0, causing the firing of monostable device 210 (FIG. 6). Consequently, the $\overline{Q}$ output of monostable device 210 assumes a logical 0, switching the output of NAND gate 208 to a logical 1 and starting the encoder or readout clock 214. The output of the readout clock 214 is coupled by line 200 to transistor 224 which is normally biased to a non-conductive or off state and is turned on each time the Q output of device 218 assume a logical 1 level. Each time the clock completes a cycle, transistor 224 is switched between its off and on states generating a series of information pulse singals on lines 234 and 236 for transmission by the telephone system to the called party.

The clock output of readout clock 214 is also fed by line 200 back to the clock input of the first flip-flop 198 of the parallel to serial flip-flop bank 192. Since all of the outputs of flip-flops 192 are connected to respective inputs of NAND gate 202, the output of gate 202 will assume a logical 0 level only when all of the Q outputs of the flip-flops 192 are at a level 1. Accordingly, after the convertor bank 192 has been preset to store the first identification digit by the binary to decimal converter 188, and upon the receipt of a train of clock pulse signals on line 200 from the readout clock 214, the convertor bank 192 will continue to count in sequence until all of the Q output signals applied to NAND gate 202 assume a logical 1 level. Thereafter, the output of gate 202 will revert to a logical 0 which will be inverted by network 204 and applied to one input of gate 208. Since the $\overline{Q}$ output of monostable device 210 reverts to a logical 1 level shortly after device 210 starts the readout clock, the receipt of the logical 1 signal on the second input of NAND gate 208 causes its output to drop to a logical 0. The logical 0 signal is applied to gate 212 and precludes the subsequent application of trigger pulses to monostable device 216. As a result, readout clock 214 stops. In this manner it can be readily appreciated that the readout clock 214 will continue to apply output pulses through transistor 224 to the telephone line 22 until the parallel to serial convertor has counted full, thereby placing all of its outputs at a logical 1 level. Since the parallel to serial convertor bank of flip-flops 192 will count full only after its preset decimal character has been counted out, the output signal applied by transistor 224 to the telephone line represents the decimal self-identification bit preset into the convertor bank 192 as a result of the addressing of memory circuit 172 by the sequencer 170.

It should be understood of course that the period of readout clock 214 is much shorter than that of the master clock 162 to allow the above described sequence of events to occur during each cycle of the master clock 162.

On the next cycle of master clock 162, the binary sequencer 170 will be stepped or clocked so as to provide a second binary input signal thereby addressing the memory circuit 172 for the readout of the second digit in the subscriber identification message. The sequence described in the preceeding pages is then repeated in its entirety whereupon the second digit of the identification message is applied to the telephone line 22 for transmission through the telephone system to the called party. After the tenth digit has been transmitted, the programmed output of memory circuit 172 will no longer change and no additional numbers will be loaded into the parallel to serial convertor bank 192. The master clock 162, however, will continue to run until all of the outputs of the binary sequencer 170 assume a logical 1 level causing the output of NAND gate 176 to revert to a logical 0. The logical 0 signal from NAND gate 176 is then fed back via line 148 to the input of gate 156 which, in cooperation with inverter 158 and gate 160, causes the master clock 162 to stop. The logical 0 signal on line 148 is also fed back through inverter 146 to input 144 of NAND gate 148 indicating that the sequence has been completed and placing the encoder in the proper state for the receipt of a subsequent interrogation command.

The INTERROGATE AND DIGITAL DISPLAY NETWORK

Turning now to the operation of the interrogate and digital display network 32 of the present invention, in the standby mode the circuit is conditioned for the detection of an incoming ringing signal. More specifically, transistor 314 of the ringing signal detector and interrogate generator stage is conductive with its collector electrode at a logical 0 level. Accordingly, both monostable devices 326 and 332 are quiescent, with the Q output of monostable device 332 at a logical 0 level. Also both transistors 342 and 344 are in a non-conductive or off state isolating their respective collective electrodes from ground, and transistor 370, which is used to level shift and shape incoming information bits from the telephone line 28, is on with its collector electrode at nearly ground potential.

Both inputs to NAND gate 396 are at a logical 1 level during standby causing the signal on line 398 to assume a logical 0. The display sequence 410 is also off at this time with the binary sequencer 418 producing a logical 1 level on each of its output leads. With all outputs of binary sequencer 418 at a logical 1 level, all of the outputs of the binary to decimal convertor 420 are at a logical 1 level whereupon the outputs of NOR gates 426 are held at a logical 0.

In operation, when the first negative cycle of ringing occurs on the telephone line 28, transistor 314 is turned off and its collector electrode assumes a logical 1 level. After being inverted twice by inverters 322 and 324 for wave-shaping purposes, the logical 1 signal is applied to one-shot 326 causing it to fire. After a few negative cycles of ringing, the capacitor 328 will become charged to a point where any further ringing cycles will no longer initiate the firing of one-shot 326. The system is therefore tripped only once for each incoming call. When monostable device 326 fires, its Q output goes to a logical 1 level, which signal is fed to the negative-going input of one-shot 332. One-shot 332 will not fire on this positive-going signal, but responds to the reversion of the output of one-shot 326 to its logical 0 level. One-shot 326 thus acts as a delay for the initiation of the interrogate sequence thereby assuring that interrogate signals are not applied back through the telephone system until after the completion of the first ringing signal burst.

When one-shot 326 times out and its Q output goes back to a logical 0, monostable 332 is fired and its Q output goes to a logical 1. As a result, transistors 342 and 344 are made conductive whereupon they try to pull the telephone line to ground level but are limited by the value of resistors 350 and 352 in their collector circuits. The switching of transistors 342 and 344 thus puts an interrogation pulse on the telephone line via lines 354 and 356. As described above, the interrogation pulse is generated and is applied back through the telephone system to the encoder network of the calling party which thereafter begins the generation and transmission of the ten pulse trains or information bits of the identification message.

Prior to the receipt of the identification message from the encoder network, the digital display unit 32 is reset through NAND gate 396. Since gate 396 has two inputs the reset signal applied via line 398 to the counters 428 may be generated in response to the occurrence of either of two events. The first is the generation of the interrogation signal as described above. When the interrogation generator one-shot 332 is fired, its $\overline{Q}$ output goes to a logical 0 for the duration of the interrogation pulse. This causes a logical 0 signal to be applied via line 333 to one input of gate 396 causing its output to assume a logical 1 level. Line 398 going to a logical 1 causes the resetting of the four-bit binary counters 428. Thus, whenever a ringing signal is detected and an interrogation pulse is generated by the display network 32, binary counters 428 are reset so that the system may display the incoming identification message regardless of whether the called subscriber answers his telephone or not. This also allows the digital display network of the present invention to retain and display the identifying telephone number of a calling party until the next incoming call is received at which time a subsequent interrogation pulse will be generated and the display tubes reset for the new incoming message.

The second means of resetting the four-bit binary counters 428 occurs when the called party hangs up. When the telephone receiver is on-hook, switch 386 is closed and transistor 390 is placed in a conductive state. Thus, the collector of transistor 390 is at a logical 0 level. When the telephone is picked up, switch 386 opens and transistor 390 turns off. Its collector electrode potential thus rises to a logical 1 level, placing a positive-going pulse on the clock input of flip-flop 384. Flip-flop 384 responds only to negative-going pulses, however, such that the transition of transistor 390 from a conductive to a non-conductive state has no effect. When the telephone is hung-up, the collector of transistor 390 goes back to a logical 0 causing flip-flop 384 to generate a logical 0 signal on its $\overline{Q}$ output. The logical 0 input to gate 396 causes the output thereof to assume a logical 1 thereby resetting the binary counters 428. When the first negative cycle of ringing occurs on the next incoming call, transistor 314 which is normally on turns off, and the generation of a logical 1 signal on line 380 resets flip-flop 384 so as to remove the resetting signal from the binary counters 428 and allow the circuit to display the incoming identification message.

The inputs of four-bit binary counters 428 are connected to respective ones of the two-input NOR gates 426, with the outputs of these gates in the standby state assuming a logical 0 level. One input of each of the 10 NOR gates 426 is connected in common to the telephone line 28 via inverter 376 and transistor 370. In the standby state, transistor 370 is conductive and therefore its collector assumes a logical 0 level. By virtue of inverter 376, all of the common inputs of the two-input gates 426 are normally held at a logical 1. Each of the other inputs of gates 426 is connected to its respective decimal output of the binary to decimal decoder 420, the outputs of which each enable one digit of the 10 digit identification number to be displayed. During standby, all of the 10 decimal outputs of convertor 420 are at a logical 1 level thereby inhibiting the passage of incoming information bits through any of the NOR gates 426 to the binary counters 428. As will be described below, the 10 outputs of the binary to decimal decoder 420 are switched to a logical 0 in sequence in response to the output of binary sequencer 418 which is, in turn, controlled by the sequence clock 410.

When sequence clock 410 is off, its Q output, i.e., the Q output of one-shot 414, is at a logical 0 and the $\overline{Q}$ output thereof is at a logical 1 . When the $\overline{Q}$ output of one-shot 332 (FIG. 8) of the interrogation pulse generator goes from the logical 1 level to the logical 0 level upon the generation of the interrogate signal, the negative-going pulse is applied by line 333 to the input of one-shot 400. Since the input of one-shot 400 responds only to a positive-going signal, the interrogation pulse has no effect. However, when the interrogation generator 332 times out and its $\overline{Q}$ output reverts back to a logical 1, monostable device 400 is fired causing its Q output to go to a logical 1 level. This causes NOR gate 404 to provide a logical 0 output thereby feeding a logical 1 to the upper input of NAND gate 408. Since the other input of NAND gate 408 is at a logical level, by reason of the Q output of one-shot 414, the NAND gate 408 generates a logical 0 output causing a negative transition to be seen by one-shot 412. This starts the operation of the sequence clock 410. The timing of monostable device 400 is preset to be slightly longer than one cycle of the timing clock 410. In this manner, the four-bit binary sequencer 418 may be clocked at least once, which will cause at least one of its outputs to change from a logical 1 to a logical 0 level. This, in turn, will change the output of the four-input NAND gate 422 to a logical 1 , which, when fed back to the upper input of NOR gate 404, assures that the sequence clock 410 will continue until the binary sequencer 418 agains produces all logical 1 level signals on its output terminals.

Each time the output of the sequence clock 410 goes to a logical 0 level, the four-bit binary counted 418 clocks one position and its outputs, and the outputs of the binary to decimal decoder 420, will change accordingly. In this manner, each of the ten outputs of the binary to decimal decoder 420 will be sequentially switched to a logical 0 level with the reset of the outputs remaining at a logical 1 level. Thus, each of the NOR gates 426 will be enabled in sequence such that each incoming pulse train, representing each received information bit or digit from the encoder, will be sequentially applied to the proper one of the four-bit binary counters 428.

Between the times when the output of the sequence clock 410 goes to a logical 0, a pulse train representing a digit of the calling party's telephone number is received over the telephone line and is amplified and changed to the correct logic level by transistor 370 and inverter 376. Transistor 370 is biased so that it is normally conducting but turns off with low level signals. Therefore, when each pulse of a received pulse train is applied to tranistor 370, the transistor turns off and its collector potential alternately goes from a logical 0 to a logical 1 level. Each of the received and level shifted pulse trains is then applied through line 378 to NOR gates 426. As noted above, each of the pulse trains on line 378 is sequentially applied to one of the counters 428 through that one NOR gate which has been enabled by the binary to decimal decoder 420. The particular binary counter 428 receiving the incoming pulse train will then count the number of pulses in the pulse train and will provide a corresponding binary output representative of the received digit. The binary output is, in turn, applied to its associated binary to decimal convertor 430 for driving the corresponding vacuum display tube 432.

When the binary sequencer 418 reaches its eleventh cycle, the outputs of the binary to decimal decoder 420 no longer change but remain at logical 1 levels. The sequence clock 418 continues to run until all of the outputs of the binary sequencer 418 assume a logical 1 level at which time the output of NAND gate 422 reverts to a logical 0 to stop the clock via gates 404 and 408. The circuit is now in a condition to receive and display a subsequent telephone identification number, with the received number stored by the binary counters 428 and displayed by the vacuum display tubes 432. The now displayed identifying number will remain until the digital display network is reset. As described above, reset will occur when the called party hangs up or when a subsequent interrogation pulse is generated.

It is also noted that each of the various monostable devices and flip-flops may be adjusted or preset for synchronizing pulse transmission and reception and for preselecting suitable delay periods as may be desired.

In installing the network according to the present invention, it is desirable that all telephones in the particular system be equipped with one of the encoder networks as described above while only particular telephones need be adapted to incorporate the interrogation and digital display network 32. In the event that a telephone subscriber has become the object of a malicious or prank caller, he need only replace his telephone, either permanently or temporarily with one equipped with digital display network 32, and the telephone number of the next annoyance caller will be automatically displayed in digital form in a matter of seconds for use by local law enforcement authorities. Furthermore, subscribers wishing to avail themselves of a form of answering service need only install a telephone equipped with digital display network 32, and all incoming calls received thereafter, whether answered or not, will produce a stored display of the identifying number of the calling party. By extending the general principles of the present invention, a suitable display circuit may be constructed so as to store and display any desired number of telephone numbers for simultaneous or sequential readout or print-out.

It therefore can be appreciated that the call tracing and identification system of the present invention will rapidly display the area code and telephone number of a calling party regardless of whether the called party has answered the telephone or not, with the stored and displayed number retained until a subsequent call is received. In addition, the principles of the present invention may be readily extended such that a plurality of incoming telephone calls may be identified and displayed, with appropriate display devices and storage networks provided for each incoming identification message. In addition, the present invention is particularly advantageous in that it requires no modification whatsoever of existing telephone facilities either at subscriber locations or at the central or local telephone exchange facilities. Of course, the exterior design of the telephone device itself may be modified to incorporate the display bank of network 32, however, no changes to the switching circuitry or the audio transmission network are required in equipping existing facilities with the call tracing and identification system of the present invention.

Inasmuch as the present invention is subject to many variations, modification and changes in detail, it is intended that all matter contained in the foregoing description or shown in the accompanying drawings shall be interpreted as illustrative and not in a limiting sense.

What is claimed is:

1. A call tracing and identification network for a telephone system connected to a calling-party telephone line and a called-party telephone line, said network comprising encoder means, connected to the calling-party telephone line, for applying to the called-party telephone line identification signals identifying the calling-party telephone line, said encoder means including means initiated at the termination of an interrogation signal on the called-party telephone line for controlling the operation of the encoder means to generate the identification signals only after the interrogation signal; and a called-party telephone device connected to the called-party telephone line including a. interrogation means for generating and applying an interrogation signal to the called-party telephone line, b. means for receiving the identification signal of the calling-party telephone line from the called-party telephone line, and c. means responsive to the receiving means for displaying a visual identification of the calling-party telephone line.

2. The invention as recited in claim 1 wherein said called-party telephone device is located entirely at a called-party substation.

3. The invention as recited in claim 1 wherein said receiving means includes storage means for storing said identification signals from said encoder means, and said displaying means includes digital display means connected with said storage means to display in digital form the visual identification of said calling-party telephone line represented by said stored identification signals.

4. The invention as recited in claim 3 wherein said called-party telephone device includes reset means connected with said storage means to reset the same in response to the generation of said interrogation signal.

5. The invention as recited in claim 3 wherein said digital display means includes a plurality of individual alphanumeric character display devices, and wherein said storage means includes a like plurality of counter circuits each connected to drive one of said plurality of display devices.

6. The invention as recited in claim 5 wherein said called-party telephone device includes storage sequencing means connected with said plurality of counter circuits to sequentially apply serial bits of information received on said called-party telephone line to each of said counter circuits.

7. The invention as recited in claim 6 wherein said storage sequencing means includes clock means and further includes a binary counter having an input connected with said clock means.

8. A call tracing and identification network for a telephone system connected to a calling-party telephone line and a called-party telephone line, said network comprising encoder means, connected to a calling-party telephone line, for applying to the called-party telephone line identification signals identifying the calling-party telephone line, said encoder means including memory means storing said identification signals and further including sequencing means connected with said memory means to sequentially condition the same for parallel readout of sequential bits of information, and said encoder means including means initiated at the termination of an interrogation signal on the called-party telephone line for controlling the operation of the encoder means; and a called-party telephone device connected to the called-party telephone line including a. interrogation means for generating and applying an interrogation signal to the called-party telephone line, b. means for receiving the identification signal of the calling-party telephone line from the called-party telephone line, and c. means responsive to the receiving means for displaying a visual identification of the calling-party telephone line.

9. The invention as recited in claim 8 wherein said sequencing means includes clock means and further includes a binary counter having an input connected with said clock means.

10. The invention as recited in claim 8 wherein said encoder means further includes conversion means connected with said memory means to receive said parallel readout of each bit of information and convert the same to serial form, said conversion means including encoder clock means connected with said calling-party telephone line for applying serial pulse trains representing each bit of information to the calling-party telephone line and the called-party telephone line.

11. The invention as recited in claim 10 wherein said conversion means includes a plurality of serially connected flip-flops.

12. The invention as recited in claim 1 wherein said interrogation means is responsive to the receipt of a ringing signal on the called-party telephone line to generate said interrogation signal.

13. The invention as recited in claim 12 wherein said interrogation means includes switch means actuable in response to said ringing signal and further includes pulse generation means for generating said interrogation signal in response to the actuation of said switch means.

14. A call tracing and identification network for a telephone system connected to a calling-party telephone line and a called-party line, said network comprising encoder means, connected to the calling-party telephone line, for applying to the called-party telephone line identification signals identifying the calling-party telephone line, said encoder means including means initiated at the termination of an interrogation signal on the called-party telephone line for controlling the operation of the encod means; and a called-party telephone device connected to the called-party telephone line including a. interrogation means for generating and applying an interrogation signal to the called-party telephone line, b. means for receiving the identification signal of the calling-party telephone line from the called-party telephone line, and c. means responsive to the receiving means for displaying a visual identification of the calling-party telephone line, said interrogation means being responsive to the receipt of a ringing signal in the called-party telephone line to generate said interrogation signal, said interrogation means including switch means actuable in response to said ringing signal and including pulse generation means for generating said interrogation signal in response to the actuation of said switch means, said pulse generation means further including first monostable means connected to said switch means and responsive to actuation thereof for producing an output signal and second monostable means connected to said first monostable means for generating said interrogation signal upon receipt of said output signal from said first monostable means, said first monostable means delaying the actuation of said second monostable means until after completion of the first ringing signal burst.

15. A call tracing and identification network for a telephone system connected to a calling-party telephone line and a called-party telephone line, said network comprising encoder means, connected to the calling-party telephone line, for applying to the called-party telephone line identification signals identifying the calling-party telephone line, said encoder means including means initiated at the termination of an interrogation signal on the called-party telephone line for controlling the operation of the encoder means; and a called-party telephone device connected to the called-party telephone line including a. interrogation means for generating and applying an interrogation signal to the called-party telephone line, b. means for receiving the identification signal of the calling-party telephone line from the called-party telephone line, and c. means responsive to the receiving means for displaying a visual identification of the calling-party telephone line, said interrogation means being responsive to the receipt of a ringing signal in the called-party telephone line to generate said interrogation signal, said interrogation means including switch means actuable in response to said ringing signal and including pulse generator means for generating said interrogation signal in response to the actuation of said switch means, and said interrogation means further including a storage capacitor connected between said switching means and said pulse generator means for preventing said pulse generator means from responding to ringing signals received after said first signal burst.

16. A call tracing identification network for a telephone system connected to a calling-party telephone line and a called-party telephone line, said network comprising an encoder circuit connected to a calling-party telephone line, said encoder circuit including a. memory means for storing parallel binary identification signals representing the calling-party telephone number, b. sequencing means operated by an interrogation signal on the calling-party telephone line for sequentially operating the memory means to read out the parallel binary identification signals of each digit of the telephone number, c. conversion means connected to the memory means for converting the parallel binary signals from the memory means to serial binary identification signals and for applying the serial binary signals to the calling-party telephone line, and d. means connected to the calling-party telephone line and responsive to a dialing signal on the calling-party telephone line for enabling operation of the encoding circuit, said enabling means preventing operation of the encoding circuit prior to the dialing signal; and a called-party telephone device connected to the called-party telephone line including a. interrogation means responsive to a first burst of a ringing signal on a called-party telephone line for generating and applying an interrogation signal to the called-party telephone line, b. means for receiving the serial binary identification signals of a calling subscriber telephone number, for converting the serial binary identification signals into parallel binary identification signals, and for storing the parallel binary identification signals, and c. means operated by the receiving means for displaying the calling-party telephone number.

17. The invention as recited in claim 1 wherein said interrogation means is initiated by a first burst of ringing signal on the called-party telephone line, and said interrogation means generates and applies the interrogation signal to the called-party telephone line only after the first burst of ringing signal.

* * * * *